Sept. 9, 1958   R. E. OWEN   2,851,302
VEHICLE FRAME AND UNDERBODY CONSTRUCTION
Filed Jan. 18, 1957   4 Sheets-Sheet 3
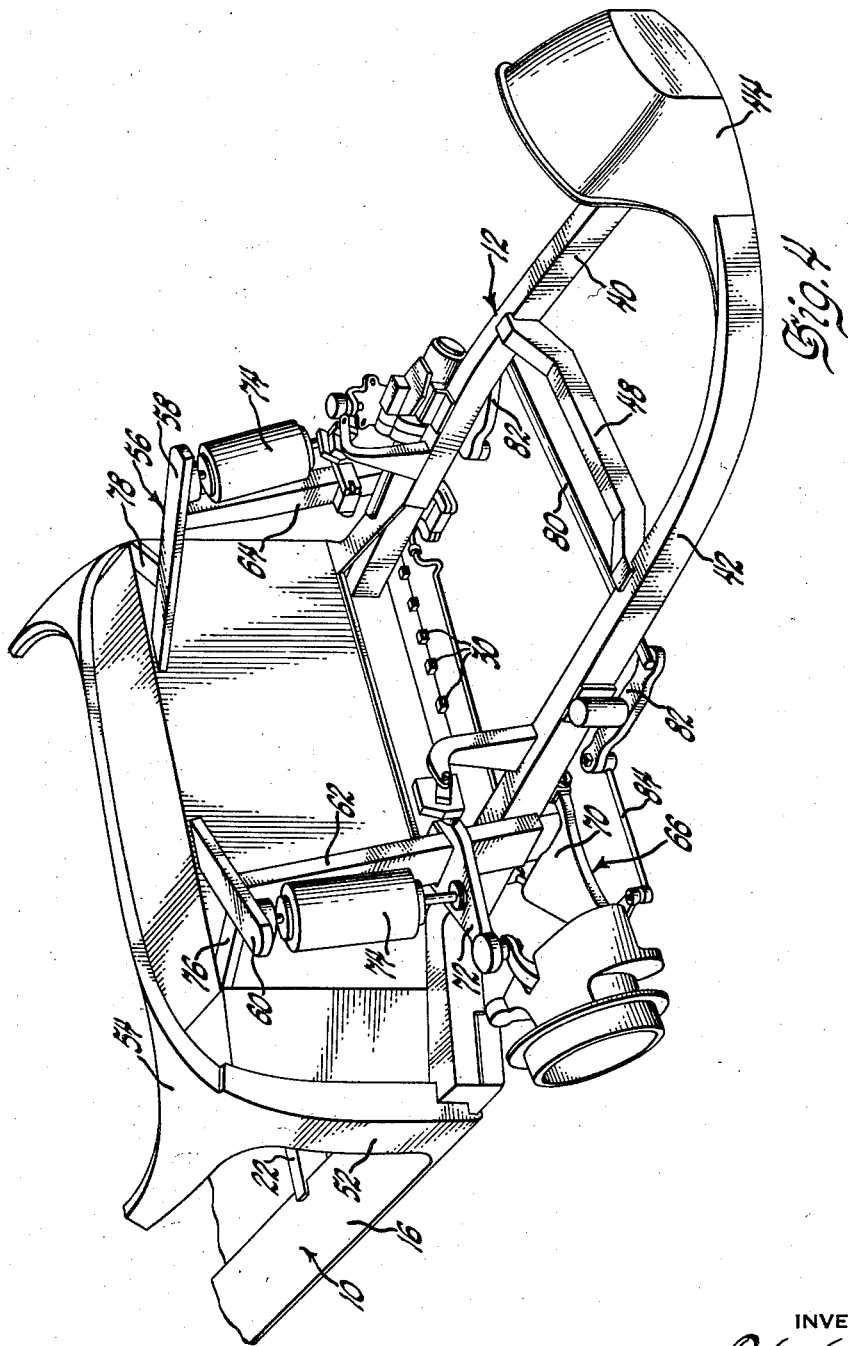
INVENTOR
Robert E. Owen
BY
ATTORNEY Sept. 9, 1958 R. E. OWEN 2,851,302
VEHICLE FRAME AND UNDERBODY CONSTRUCTION
Filed Jan. 18, 1957 4 Sheets-Sheet 4
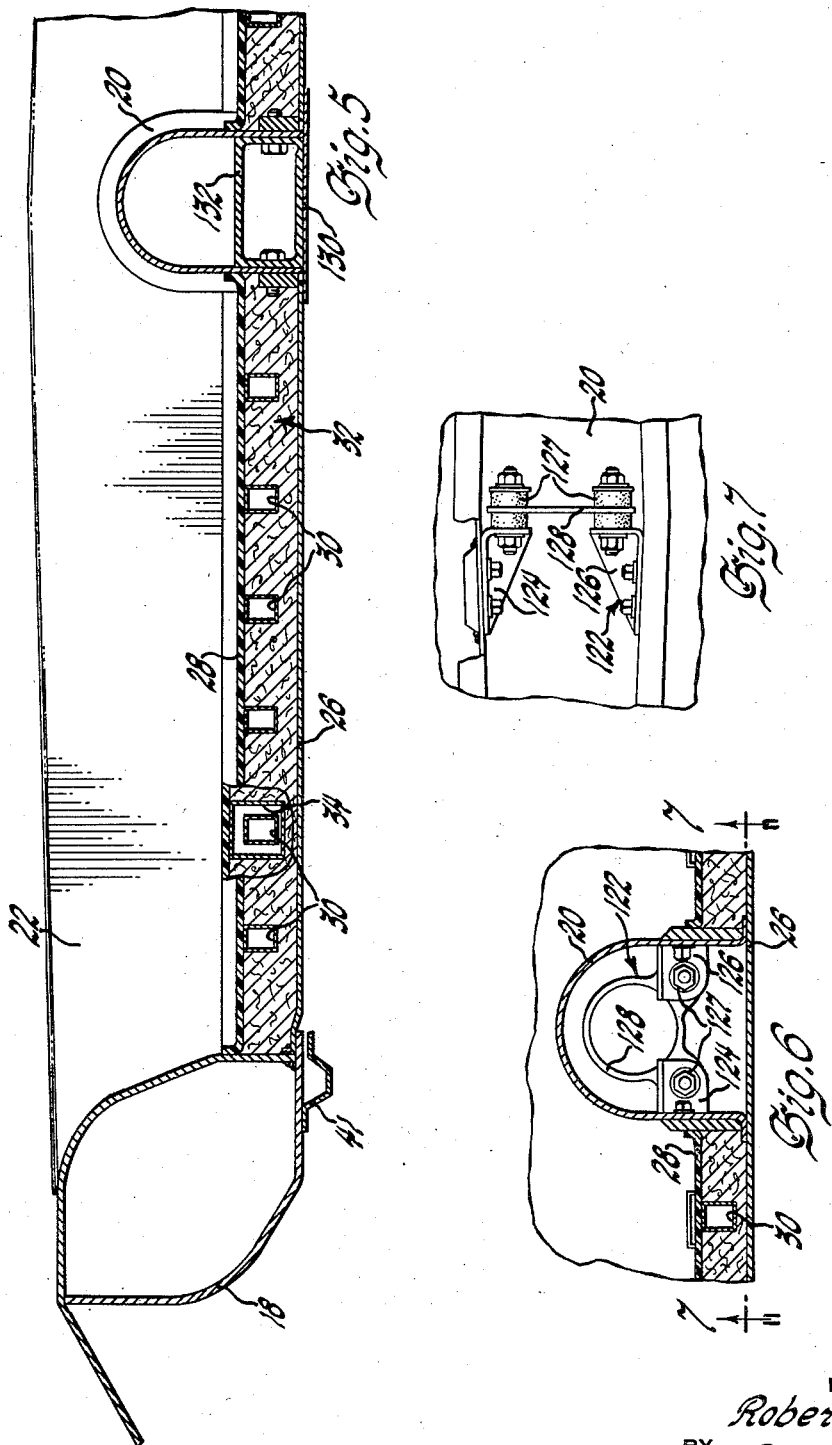
INVENTOR
Robert E. Owen
BY
L. D. Burch
ATTORNEY United States Patent Office 2,851,302
Patented Sept. 9, 1958

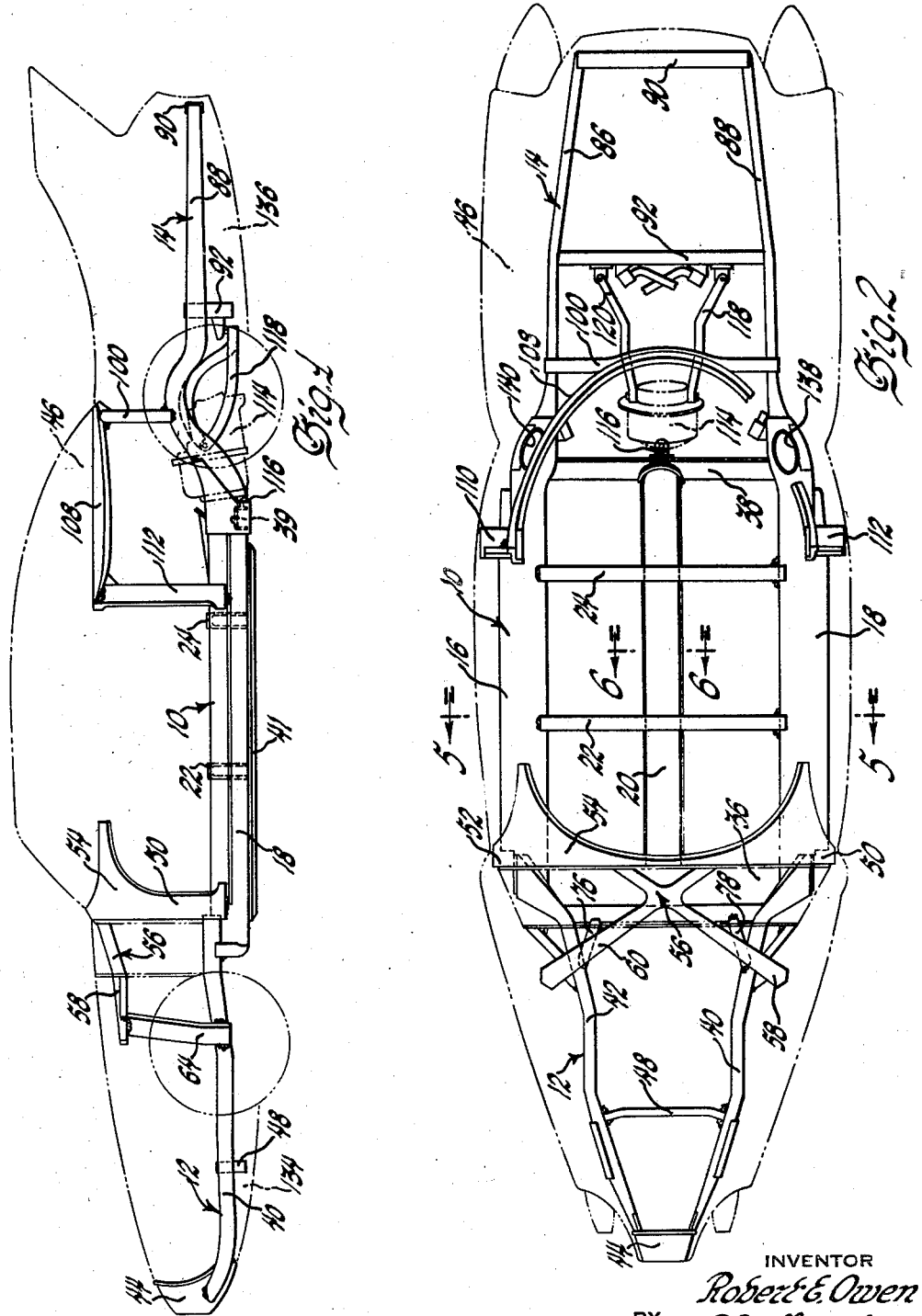

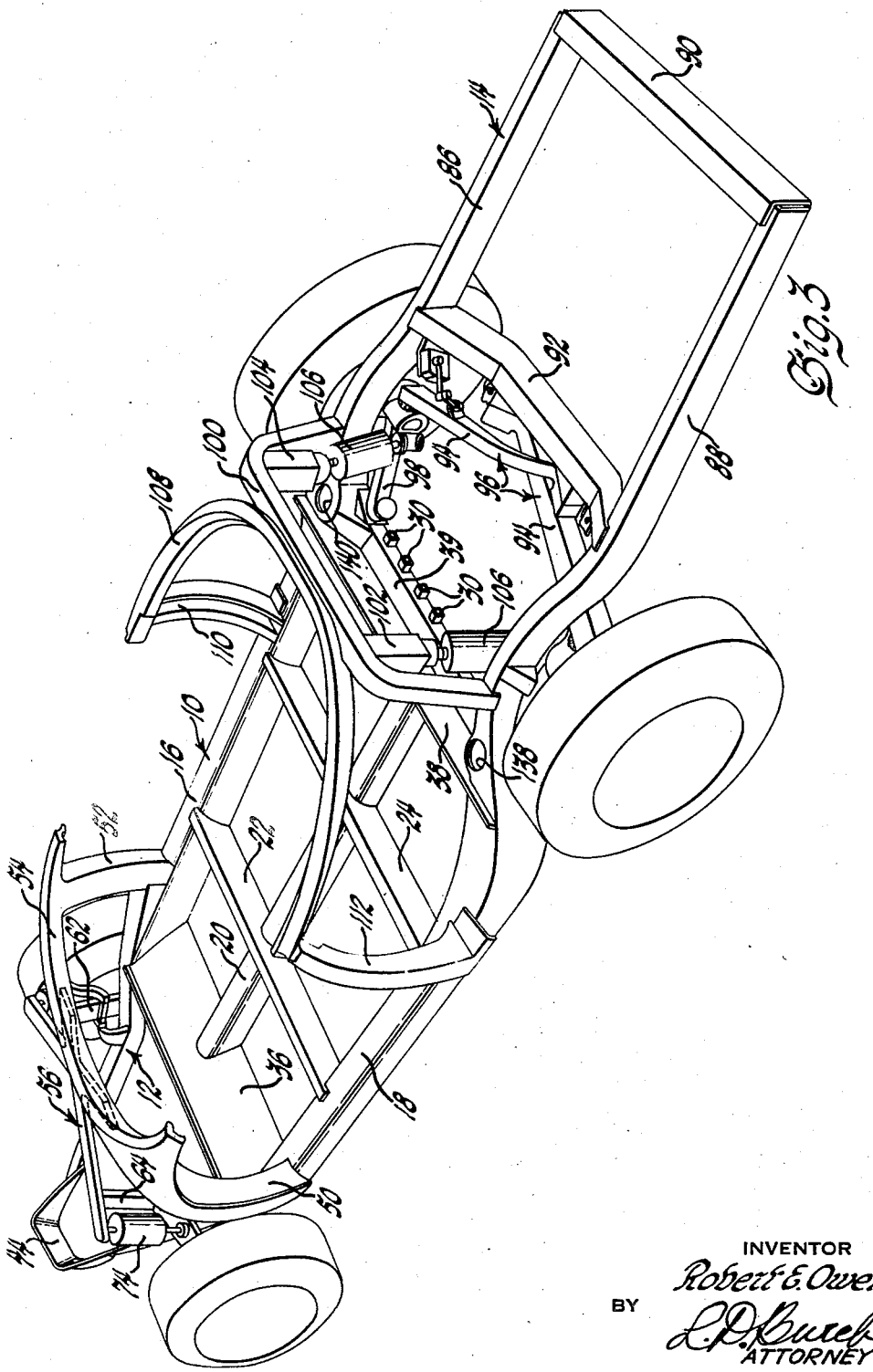

2,851,302

VEHICLE FRAME AND UNDERBODY CONSTRUCTION

Robert E. Owen, Detroit, Mich., assignor to General Motors Corporation, Detroit, Mich., a corporation of Delaware Application January 18, 1957, Serial No. 635,071

4 Claims. (Cl. 296—28)

This invention relates to road vehicles generally and more particularly to the chassis construction of a new and improved automotive vehicle.

The proposed automotive vehicle includes an integral frame and underbody construction which provides greater structural strength, lower vehicle height, and a closed vehicle underbody. Structural members interconnected with frame members are adapted to best receive and transmit frame stresses and serve as well to support the vehicle body. The forwardly extending A-frame receiving the vehicle power plant and the vehicle road wheels is supported to the integral frame unit by new and novel supporting braces which also serve to support the front suspension units. The body supporting cowl and rear quarter bracings are such as eliminate the need for roof bracing as presently known.

These and numerous other features will be described in further detail.

In the drawings:

Figure 1 is a side view of the proposed vehicle chassis showing a vehicle body in phantom thereon.

Figure 2 is a top view of the chassis of Figure 1 showing the vehicle body in outline.

Figure 3 is a rear quarter perspective view of the proposed vehicle chassis.

Figure 4 is a front quarter view of a part of the proposed vehicle chassis.

Figure 5 is a cross-sectioned detail view of the underbody of the proposed vehicle taken in the plane of line 5—5 of Figure 2, looking in the direction of the arrows thereon.

Figure 6 is a cross-sectioned detail view of the drive shaft support means of the proposed chassis as taken in the plane of line 6—6 of Figure 2, looking in the direction of the arrows thereon.

Figure 7 is a detail view of the shaft support means of Figure 6, taken in the plane of line 7—7 thereon and looking in the direction of the arrows.

The proposed automotive vehicle chassis includes an integral frame and underbody construction 10 supporting a forwardly extending A-frame 12 and a rearwardly disposed frame portion 14.

The integral frame and underbody 10 includes spaced tubular side rail portions 16 and 18 having a drive shaft receiving tunnel section 20 disposed therebetween and in parallel relation therewith, with transverse cross braces 22 and 24 tying them all together and a thin gauge sheet metal underpan 26 providing the undersurface therefor. The underpan 26 also serves to close the tunnel section except for access provided near the forward end thereof as will be later described. A floor pan 28 having square tubular members 30 secured to the underside thereof, and extending lengthwise, is secured in spaced relation over the underpan 26 and between the side rail portions 16 and 18 and tunnel section 20. A plastic matrix 32 fills the space between the floor and underpans.

The cutaway section of Figure 5 shows that the tubular members or conduits 30 extend through accesses 34 provided in the cross braces 22 and 24. The conduits provide lateral reinforcement of the underbody and are adapted to receive control lines and the like which are necessary to pass between one end of the underbody and the other. The conduits may also be used, with proper fittings, as fluid lines.

The forward end of the floor pan 28 is formed to provide an end wall 36 in the area presently referred to as the "toe board area." The other end of the floor pan is also formed upwardly and with the transverse frame member 39 secured between the ends of the side rail members thereunder forms the end wall 38 to complete the box or tray-like underbody.

Skid rails 41 may be provided along each side rail to protect the underbody in the advent of serious tire failure. The engine and suspension supporting frame section 12 includes box-sectioned rails 40 and 42 supported across the front of the underbody portion 10 and extending forwardly in converging relation. The forward ends of the rails are curved upwardly and joined together by a massive boxed bumper member 44 which is at the extreme forward point of the body portion 46 which is received on the proposed chassis (as seen in phantom in Figures 1 and 2). A cross brace 48 extends between the side rails 40 and 42 and serves as a front support for the vehicle engine.

The cowl section of the proposed chassis includes upright supports or pillar posts 50 and 52 mounted on the forward ends of the tubular side rails 16 and 18 and a semi-circular cowl bar 54 supported on the supports.

An X-brace 56 is built into the cowl bar 54 and has ends 58 and 60 extending forward and out over the side rails 40 and 42 of the A-frame 12. Suspension supports 62 and 64 are secured between the rails 40 and 42 and the ends of the X-brace.

The independent front suspension units 66 each include a lower wheel supporting member 70 secured to a frame rail just below one of the supports, and an upper wheel supporting member 72 mounted on the support. The spring unit 74 is connected between the upper support 70 and the end of the X-brace directly thereover.

The structural supports just described are arranged to best cope with frame stresses and to properly distribute them through the underbody. Forces received through the suspension units are carried into the cowl bar 54 by the X-brace and across the cowl bar and back into the tubular frame rails 16 and 18 through supports 50 and 52. Horizontal braces 76 and 78 are secured between the ends of the X-brace and the ends of the cowl section, as best shown in Figures 2 and 4. Vertical panels (not shown) may be secured between the horizontal brace, upright support, forward frame rail, and cowl support to distribute extraneous forces back into the immediate cowl support bar. These panels are not shown specifically because of the difficulty of illustration but should be readily apparent to a chassis engineer from the comment just made.

The front wheel steering mechanism is shown to include the tie rod 80 and connecting links 82 and 84 mounted on the frame portion 12. The tie rod extends under the general location of the front end of the proposed location of the engine.

The after frame section 14 includes box-sectioned side rails 86 and 88 which are secured to the ends of the tubular rails 16 and 18 of the underbody and have their ends secured together by cross rail 90. An intermediate brace 92 also extends between the side rails and serves to receive one fork arm 94 of the swing axles 96. The other fork arm 98 is mounted to the end wall 38 of the underbody, as best shown in Figure 3.

An arched cross support 100 extends between the frame rails 86 and 88 and is secured to them at approximately the raised or kick-up portion thereof. The arched support includes depending locator blocks 102 and 104 to which one end of the rear suspension spring units 106 are secured. Their other ends are fastened to the swing axles 96.

The arched support 100 also serves to support the roof sill bar 108 which is shown as arcuate in shape and having its forward ends connected to the underbody by pillar posts 110 and 112.

A comparison of the structural arrangements of the sill bar support means with that of the cowl bar show that the sill bar supports are similarly disposed to cope with frame stresses received through or at the rear vehicle wheels.

The differential drive unit 114 is adapted to be disposed within the after frame section 14 in line with the drive shaft tunnel section 20 formed in the underbody and is supported as at 116 from frame member 39 of the end wall 38 and by braces 118 and 120 connecting to cross rail 90.

A drive shaft center bearing support means 122 is disposed within the drive shaft tunnel section and includes support brackets 124 and 126 secured to opposite side walls of the tunnel section which receive and support resilient mounts 127 having a bearing retainer ring 128 engaged therewith for receiving the drive shaft and its center bearing means (which are not shown).

The forward end of the underpan 26, immediately under the tunnel section 20, is relieved to provide ready access to the drive shaft connection to the drive means which is located forwardly thereof. This access is closed by a plate member 130 shown in Figure 5 and may be secured to the underpan by any suitable fastening means.

The drive shaft tunnel section 20 also includes structural braces 132 secured at spaced intervals between the side walls of the tunnel section. These braces are disposed below the drive line and serve to further reinforce the tunnel section so that it may appreciably contribute as a structural beam in the underbody assembly.

The phantom outline of the vehicle body shown in Figures 1 and 2 shows a body structure 46 which closely fits the chassis outline. The roof section requires no structural supports in cooperation with the frame member and may, in fact, be a detachable unit received and supported on the cowl bar 54 and after sill rail 108. The front of the vehicle converges toward the nose or bumper member 44, giving a streamlined and aerodynamic appearance to the vehicle outline. The frame sections 12 and 14 may have their undersides enclosed as by underpan portions 134 and 136, shown in phantom outline. The general disposition of these underpan portions, relative to the underpan 26, provides an enclosed and wind resistant under structure. The after end of the underpan portion 134 is disposed lower than underpan 26 so that engine gases may be exhausted directly from the engine compartment, if desired, and will readily flow under the vehicle. Exhaust means for engine gases may also be provided through the tubular side rails 16 and 18 with suitable exhaust conduits (not shown) connected at the outlet openings 138 and 140, shown in Figures 2 and 3. Since these outlets are within the rear wheel housing area, it is also foreseeable that the gases may be emitted directly therefrom and allow for the air flow through the wheel housing to carry off the exhaust fumes.

I claim:

1. A vehicle chassis including an integral frame and underbody center section having forwardly and rearwardly extending frame portions secured to opposite ends thereof, upright support posts secured to the forward ends of said center section, a cowl bar supported on said support posts and including divergent horizontal braces extended forwardly therefrom in spaced relation over the sides of said forwardly extending frame portion, and suspension supports secured between the ends of said braces and said forwardly extending frame portion for supporting a suspension unit thereon and distributing frames stresses through and diagonally across said cowl bar into said underbody center section via said support posts.

2. A vehicle chassis including an integral frame and underbody center section having forwardly and rearwardly extending frame portions secured to opposite ends thereof, upright support posts secured to the after ends of said center section, a roof sill bar having its forwardly disposed ends secured to said support posts, and an arched frame brace secured to and extended between the side rails of said rearwardly disposed frame portion, said brace having its arched portion secured to said sill bar for supporting said bar, said brace having part of said rear suspension system secured thereto and having its arched portion secured to said sill bar for supporting said bar and transmitting frame stresses therethrough to said underbody center section.

3. The vehicle chassis provided for by claim 1 and having upright supports secured near the after ends of said center section, a roof sill bar having its forward ends secured to said posts, an arched brace secured between the sides of said rearwardly extending frame portion and secured to said sill bar intermediate its ends for supporting said sill bar and transmitting frame stresses from said rearwardly extending frame portion through said sill bar and to said underbody center section.

4. A vehicle chassis including an integral frame and underbody center section having forwardly and rearwardly extending frame portions secured to opposite ends thereof, said center section comprising spaced and tubular side rails having a tunnel section disposed in parallel spaced relation therebetween, transverse frame rails secured between said side rails and across said tunnel section, an underpan secured to the underside of said side rails and tunnel section and extended therebetween for covering and closing said underbody, said underpan including lateral reinforcement and having the ends thereof formed to provide end walls for said underbody center section, said lateral reinforcement including a floor pan covering disposed in spaced relation over said underpan, laterally disposed tubular members extending the length of said underbody between said floor and underpans and through said transverse frame rails, and a matrix material filling the space between said floor and underpans and bonding said tubular members therewithin to provide greater lateral strength within said underbody center section.

References Cited in the file of this patent

UNITED STATES PATENTS

| | | |
|---|---|---|
| 2,108,215 | Stief et al. | Feb. 15, 1938 |
| 2,126,607 | Boehner | Aug. 9, 1938 |
| 2,710,222 | Barenyi | June 7, 1955 |
| 2,730,185 | Giacosa | Jan. 10, 1956 |

FOREIGN PATENTS

| | | |
|---|---|---|
| 601,189 | Germany | Aug. 10, 1934 |
| 934,628 | Germany | Nov. 3, 1955 |